US010565537B1

(12) United States Patent
Askew (10) Patent No.: US 10,565,537 B1
(45) Date of Patent: Feb. 18, 2020

(54) SYSTEMS, METHODS, AND APPARATUSES FOR OPTIMIZING OUTCOMES IN A MULTI-FACTOR SYSTEM

(71) Applicant: William Spencer Askew, Canton, GA (US)

(72) Inventor: William Spencer Askew, Canton, GA (US)

( * ) Notice: Subject to any disclaimer, the term of this patent is extended or adjusted under 35 U.S.C. 154(b) by 0 days.

(21) Appl. No.: 16/008,914

(22) Filed: Jun. 14, 2018

Related U.S. Application Data

(60) Provisional application No. 62/519,613, filed on Jun. 14, 2017.

(51) Int. Cl.
  *G06Q 10/06* (2012.01)
  *G06N 20/10* (2019.01)
  *G06F 3/0481* (2013.01)
  *G06N 20/00* (2019.01)

(52) U.S. Cl.
  CPC ....... *G06Q 10/0633* (2013.01); *G06F 3/0481* (2013.01); *G06N 20/00* (2019.01)

(58) Field of Classification Search
  CPC ... G06Q 10/0633; G06N 20/00; G06F 3/0481
  See application file for complete search history.

(56) References Cited

U.S. PATENT DOCUMENTS

| | | | |
|---|---|---|---|
| 6,915,268 | B2 | 7/2005 | Riggs et al. |
| 7,194,695 | B1 | 3/2007 | Racine et al. |
| 7,219,067 | B1 | 5/2007 | McMullen et al. |
| 7,395,237 | B1 | 7/2008 | Hall et al. |

(Continued)

FOREIGN PATENT DOCUMENTS

WO 2001026016 A2 4/2001

OTHER PUBLICATIONS

Ochoa, et al., Logistics Optimization Service Improved with Artificial Intelligence, 2010.

(Continued)

*Primary Examiner* — Sujay Koneru
(74) *Attorney, Agent, or Firm* — Morris, Manning & Martin, LLP; Daniel E. Sineway, Esq.; Daniel T. Begasse (57) ABSTRACT

Systems and methods for optimizing outcomes in multi-factor systems are described. Business process management, consulting intelligence, business intelligence, mobile intelligence, artificial intelligence, machine learning, and transportation management are integrated, as discussed herein, for optimizing transportation and logistics processes. Users may input legacy knowledge and data such as text, numbers, formulas, algorithms, and automated processes into a computing system for providing the system with industry insights for intelligently analyzing situation contexts, or the system may leverage third-party data. The system may suggest recommended actions based on analyzed situation contexts, and the system may furthermore execute various actions for responding to the situation contexts. The system may be configured to automatically analyze situation contexts and furthermore automatically execute various actions for responding to the situation contexts. In particular embodiments, the system is a software service and may integrate with various computing devices and operating systems.

10 Claims, 7 Drawing Sheets

EXEMPLARY PLATFORM ARCHITECTURE

(56) References Cited

U.S. PATENT DOCUMENTS

| | | | |
|---|---|---|---|
| 7,647,233 B2 | 1/2010 | Kadaba et al. | |
| 8,078,485 B1 | 12/2011 | Kraehmueller et al. | |
| 8,713,076 B2 | 4/2014 | Martin et al. | |
| 8,725,656 B1 | 5/2014 | Gill et al. | |
| 9,349,150 B2 | 5/2016 | Chidlovskii | |
| 2002/0049622 A1 | 4/2002 | Lettich et al. | |
| 2003/0135304 A1 | 7/2003 | Sroub et al. | |
| 2003/0172007 A1* | 9/2003 | Helmolt | G06Q 10/06316 705/28 |
| 2004/0073499 A1* | 4/2004 | Martin | G06Q 10/08 705/28 |
| 2005/0096950 A1* | 5/2005 | Caplan | G06Q 10/06314 705/7.24 |
| 2008/0027769 A1 | 1/2008 | Eder | |
| 2008/0291033 A1* | 11/2008 | Aghassipour | G06Q 10/08 340/584 |
| 2009/0089150 A1 | 4/2009 | Lee et al. | |
| 2010/0250446 A1 | 9/2010 | MacKenzie et al. | |
| 2012/0226624 A1* | 9/2012 | Song | G06Q 10/083 705/338 |
| 2013/0036068 A1 | 2/2013 | Smith et al. | |
| 2013/0159208 A1 | 6/2013 | Song et al. | |
| 2013/0246298 A1 | 9/2013 | Higham et al. | |
| 2013/0254131 A1 | 9/2013 | Hubert | |
| 2014/0019471 A1* | 1/2014 | Linton | G06N 5/02 707/759 |
| 2014/0058794 A1 | 2/2014 | Malov et al. | |
| 2015/0006428 A1 | 1/2015 | Miller et al. | |
| 2015/0046363 A1 | 2/2015 | McNamara et al. | |
| 2015/0161556 A1 | 6/2015 | Jena | |
| 2015/0324715 A1 | 11/2015 | Nelson et al. | |
| 2015/0324740 A1* | 11/2015 | Shao | G06Q 10/04 705/331 |
| 2016/0042321 A1* | 2/2016 | Held | G06Q 10/08355 705/338 |
| 2016/0104111 A1 | 4/2016 | Jones et al. | |
| 2016/0104114 A1* | 4/2016 | Speich | G06Q 10/08355 705/338 |
| 2016/0196527 A1 | 7/2016 | Bose et al. | |
| 2017/0178057 A1* | 6/2017 | Al Rifai | G06Q 10/083 |
| 2018/0046964 A1* | 2/2018 | Leoni | G06Q 10/06315 |
| 2018/0082253 A1* | 3/2018 | Chowdhary | G06Q 10/1095 |
| 2018/0101800 A1* | 4/2018 | Lecue | G06F 17/2705 |
| 2018/0268359 A1* | 9/2018 | Soubhagya | G06Q 10/08 |

OTHER PUBLICATIONS

Tse, et al., Solving Complex Logistics Problems with Multi-Artificial Intelligent System, 2009.

Lau, et al., An Intelligent Approach for Optimizing Supply Chain Operations, Jun. 2015.

Krauth, et al., Performance Measurement and Control in Logistics Service Providing, 2005.

Franklin, et al., "Cloud Based" Collaboration Platform for Transport and Logistics Business Networks, Jun. 13, 2012.

Chow, et al., Design of a Knowledge-Based Logistics Strategy System, 2005.

Zhang, et al., Data-Driven Intelligent Transportation Systems: A Survey, Dec. 2011.

MHI, Smart Logistics (4.0): End-to-end optimization on the basis of maximum data transparency, Apr. 6, 2016.

* cited by examiner

FIG. 1: EXEMPLARY SYSTEM OPERATIONAL ENVIRONMENT

FIG. 2: EXEMPLARY INFRASTRUCTURE ARCHITECTURE

FIG. 3: EXEMPLARY PLATFORM ARCHITECTURE

FIG. 4: EXEMPLARY SYSTEM PROCESS

FIG. 5: ADVISOR DETERMINATION PROCESS

FIG. 6: ADVISOR DATA GATHERING PROCESS

FIG. 7: DETERMINE ADVISOR RESPONSE PROCESS

SYSTEMS, METHODS, AND APPARATUSES FOR OPTIMIZING OUTCOMES IN A MULTI-FACTOR SYSTEM

CROSS REFERENCE TO RELATED APPLICATIONS

This application claims the benefit of and priority to U.S. provisional patent application No. 62/519,613, filed on Jun. 14, 2017, and entitled "SYSTEMS, METHODS, AND APPARATUSES FOR OPTIMIZING OUTCOMES IN A MULTI-FACTOR SYSTEM," the disclosure of which is incorporated by reference in its entirety as if the same were fully set forth herein.

TECHNICAL FIELD

The present systems, methods, and apparatuses relate generally to optimizing outcomes in a multi-factor system, and more particularly to incorporating business process management, consulting intelligence, business intelligence, mobile intelligence, artificial intelligence, machine learning, and transportation management (TMS) into an integrated system for optimizing transportation and logistics processes.

BACKGROUND

Generally, most multi-party shipping and logistics processes are handled manually, or via rudimentary computer systems that lack the sophistication necessary to identify problems or patterns, analyze better alternatives, and react on-the-fly to changing conditions. Therefore, there exists a long-felt but unresolved need for systems, methods, and apparatuses for analyzing limitless numbers of variables in real-time and enhancing and changing processes within the complicated multi-party shipping and logistics industries.

BRIEF SUMMARY OF THE DISCLOSURE

Briefly described, and according to one embodiment, aspects of the present disclosure generally relate to systems, methods, and apparatuses for optimizing systems that include multiple players, entities, assets, locations, and other factors, such as the transportation and logistics industry. More particularly, the present systems, methods, and apparatuses incorporate business process management, consulting intelligence, business intelligence, mobile intelligence, artificial intelligence, machine learning, and transportation management (TMS) into an integrated system for optimizing transportation and logistics processes. In various embodiments, the present systems, methods, and apparatuses are capable of being integrated into preexisting systems in various markets for analyzing business goals, business objectives, business topics, business departments, and business data.

At a high level, the present technology relates to an artificial intelligence (AI) and machine learning platform for use in complicated multi-factor systems, such as those in the shipping and logistics industries. In particular, the platform is able to assess, analyze, and provide recommendations for a plurality of business and logistical situations that affect all involved entities (e.g., shippers, third-party logistics providers, freight forwarders, LTL brokers, truckload brokers, LTL carriers, truckload carriers, drayage carriers, cartage agents, couriers, parcel carriers, etc.) within the shipping industry or any other appropriate industry.

In one embodiment, a method is disclosed herein for optimizing outcomes in logistics workflows via one or more electronic computing devices, comprising the steps of: identifying a logistics task for optimization via an electronic computing device, wherein the logistics task comprises one or more task parameters; retrieving, via the electronic computing device, logistics task data corresponding to the logistics task; determining, via the electronic computing device, an optimized logistics outcome, wherein determining the optimized logistics outcome comprises applying the logistics task data and the one or more task parameters to a plurality of potential outcomes; and initiating one or more logistics actions based on the optimized logistics outcome.

In various embodiments, the method further comprises the step of, prior to identifying a logistics task for optimization, receiving a request from a user of the electronic computing device for identifying the logistics task for optimization. In a particular embodiment, the method further comprises the step of, prior to initiating one or more logistics actions based on the optimized logistics outcome, receiving one or more logistics actions selected by a user at the electronic computing device. In a certain embodiment, the method further comprises the step of, prior to receiving one or more logistics actions selected by the user, modifying a display at the electronic computing device for presenting the user with the optimized logistics outcome.

According to various aspects of the present disclosure, the optimized logistics outcome is selectable by the user. In some embodiments, the logistics task is identifiable from a group comprising shipments, deliveries, manufacturing schedules, and payment schedules. In various embodiments, the one or more task parameters comprises routes, time frames, prices, personnel requirements, and weather factors corresponding to the logistics task. In one embodiment, the logistics task data comprises real-time data, historical data, user-supplied data, and third-party data. In particular embodiments, the plurality of potential outcomes comprise machine learning-generated outcomes and/or previously-determined outcomes. In certain embodiments, identifying a logistics task for optimization further comprises automatically analyzing changes to the one or more task parameters via machine learning techniques.

In various embodiments, a system is disclosed herein comprising one or more electronic computing devices configured for optimizing outcomes in logistics workflows, the one or more electronic computing devices comprising one or more processors operable to: identify a logistics task for optimization, wherein the logistics task comprises one or more task parameters; retrieve logistics task data corresponding to the logistics task; determine an optimized logistics outcome, wherein determining the optimized logistics outcome comprises applying the logistics task data and the one or more task parameters to a plurality of potential outcomes; and initiate one or more logistics actions based on the optimized logistics outcome.

In one embodiment of the system, prior to identifying a logistics task for optimization, the one or more processors are further operable to receive a request from a user of the one or more electronic computing devices for identifying the logistics task for optimization. In various embodiments of the system, prior to initiating one or more logistics actions based on the optimized logistics outcome, the one or more processors are further operable to receive one or more logistics actions selected by a user at the one or more electronic computing devices. In a particular embodiment of the system, prior to receiving one or more logistics actions selected by the user, the one or more processors are further operable to modify a display at the one or more electronic computing devices for presenting the user with the optimized logistics outcome.

In certain embodiments, the optimized logistics outcome is selectable by the user. In particular embodiments, the logistics task is identifiable from a group comprising shipments, deliveries, manufacturing schedules, and payment schedules. According to various aspects of the present disclosure, the one or more task parameters comprises routes, time frames, prices, personnel requirements, and weather factors corresponding to the logistics task. In some embodiments, the logistics task data comprises real-time data, historical data, user-supplied data, and third-party data. In a particular embodiment, the plurality of potential outcomes comprise machine learning-generated outcomes and/or previously-determined outcomes. In certain embodiments, identifying a logistics task for optimization further comprises automatically analyzing changes to the one or more task parameters via machine learning techniques.

In one embodiment, the present disclosed discusses a computer-implemented method for generating optimized logistics outcomes comprising the steps of: receiving, at a computing device, one or more data elements from one or more third-party factors, the one or more third-party factors operable to periodically transmit the one or more data elements to the computing device, the one or more data elements comprising status indicators corresponding to a current status of the one to more third-party factors; receiving a request, from a user, for historical and/or real-time summaries of the one or more data elements; determining one or more preconfigured software modules for processing the request, wherein the one or more preconfigured software modules integrate machine learning techniques with business intelligence; processing the request via the one or more preconfigured software modules; modifying a display at the computing device to present a suggestion in response to processing the request, the suggestion comprising a suggested action for an optimized outcome; receiving a response from the user, the response comprising an indication of intent for executing the suggested action; and processing the user response, wherein processing the user response comprises modifying one or more logistics tasks corresponding to the one or more third-party factors for generating the optimized outcome.

In various embodiments, the request from the user is received via a web browser input. In particular embodiments, the status indicators comprise particular sensor readings, processed payments, traffic patterns and/or weather forecasts. In some embodiments, the business intelligence comprises industry data provided by the user. In certain embodiments, the business intelligence is provided by the user during an initial registration period via self-service advisor cards (e.g., the user may provide configuration data for representing an advisor, the data including the UI elements, functional elements, and action elements that the advisor may use to use in order to execute logistics tasks/suggestions). According to various aspects of the present disclosure, the suggestion is a digitally visible alert selectable by the user.

In one embodiment, processing the user response comprises transmitting the user response to a remote computing system operatively connected to the one or more third-party factors over a communications network, the remote computing system comprising one or more computing units configured to execute the one or more logistics tasks. In various embodiments, the one or more data elements comprise JSON data. In some embodiments, the one or more third-party factors periodically transmit the one or more data elements to the computing device in response to REST API calls.

According to various aspects of the present disclosure, a system is described for generating optimized logistics outcomes comprising: one or more third-party factors operable to detect logistics opportunity instances relating to a logistics outcome, wherein the one or more third-party factors are further operable to collect one or more data elements corresponding to the logistics opportunity instances and store the one or more data elements in a database operatively connected to the one or more third-party factors; and a computing device comprising at least one processor, the computing device operatively connected to the one or more third-party factors and the database, wherein the at least one processor is configured to: receive the one or more data elements from the one or more third-party factors, the one or more third-party factors operable to periodically transmit the one or more data elements to the computing device, the one or more data elements comprising status indicators corresponding to a current status of the one to more third-party factors; receive a request, from a user of the computing device, for historical and/or real-time summaries of the one or more data elements; determine one or more preconfigured software modules for processing the request, wherein the one or more preconfigured software modules integrate machine learning techniques with business intelligence; process the request via the one or more preconfigured software modules; modify a display at the computing device to present a suggestion in response to processing the request, the suggestion comprising a suggested action for an optimized outcome; receive a response from the user, the response comprising an indication of intent for executing the suggested action; and process the user response, wherein processing the user response comprises modifying one or more logistics tasks corresponding to the one or more third-party factors for generating the optimized outcome.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DEFINITIONS

Prior to a detailed description of the disclosure, the following definitions are provided as an aid to understanding the subject matter and terminology of aspects of the present systems and methods, are exemplary, and not necessarily limiting of the aspects of the systems and methods, which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Advisor: An advisor generally represents a piece of software code that is used to submit queries to databases or other system components. Generally, the advisors comprise pre-programmed queries, but can also be generated dynamically by system users. For example, an advisor may relate to a task such as "identify the number of times that a particular type of shipment has been made for a specific customer from destination A to destination B over the past month." As will be appreciated, there are limitless advisors that can be used or implemented by the present system.

An advisor generally includes a request or task, a set of analyzers (to be defined below) that could be used to answer or complete the request or task, and a predetermined set of actions that could be presented to a system user or system component based on the information identified or retrieved from an analyzer. Thus, in one embodiment, advisors include logic (generally in the form of computer instructions or code) that is able to parse requests, identify possible data locations, retrieve necessary data, process the data, and present and process results or actions to a user or other system component. In certain cases, advisors can be automatically processed by the system.

Analyzer: An analyzer generally represents an allocated portion of computing processing power, computing storage, and/or intelligent software code to analyze particular portions of large scale data sets. Generally, analyzers provide a divide-and-conquer approach to understanding large data sets, recognizing patterns and trends, and ultimately allowing the system to make the most informed decision based on user-provided information, previous outcomes, predicted outcomes, etc. Referring back to the example used in the advisor definition above, separate analyzers may be responsible for handling the data related to the specific customer's transactions, shipments departing from location A, shipments arriving at location B, and all shipments from the particular month. Combining each analyzer for a particular advisor provides the system with a complete view of the situation context and allows for every data point to be considered when making intelligent decisions about the particular task. As will be appreciated, there are limitless analyzers that can be used or implemented by the present system.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Briefly described, and according to one embodiment, aspects of the present disclosure generally relate to systems, methods, and apparatuses for optimizing systems that include multiple players, entities, services, assets, locations, and other factors, such as the transportation and logistics industry. More particularly, the present systems, methods, and apparatuses incorporate business process management, consulting intelligence, business intelligence, mobile intelligence, artificial intelligence, machine learning, and transportation management (TMS) into an integrated system for optimizing transportation and logistics processes. In various embodiments, the present systems, methods, and apparatuses are capable of being integrated into preexisting systems in various markets for analyzing business goals, business objectives, business topics, business departments, and business data.

At a high level, the present technology relates to an artificial intelligence (AI) and machine learning platform for use in complicated multi-factor systems, such as those in the shipping and logistics industries. In particular, the platform is able to assess, analyze, and provide recommendations for a plurality of business and logistical situations that affect all involved entities (e.g., shippers, third-party logistics providers, freight forwarders, LTL brokers, truckload brokers, LTL carriers, truckload carriers, drayage carriers, cartage agents, couriers, parcel carriers, etc.) within the shipping industry or any other appropriate industry.

Figure 1:
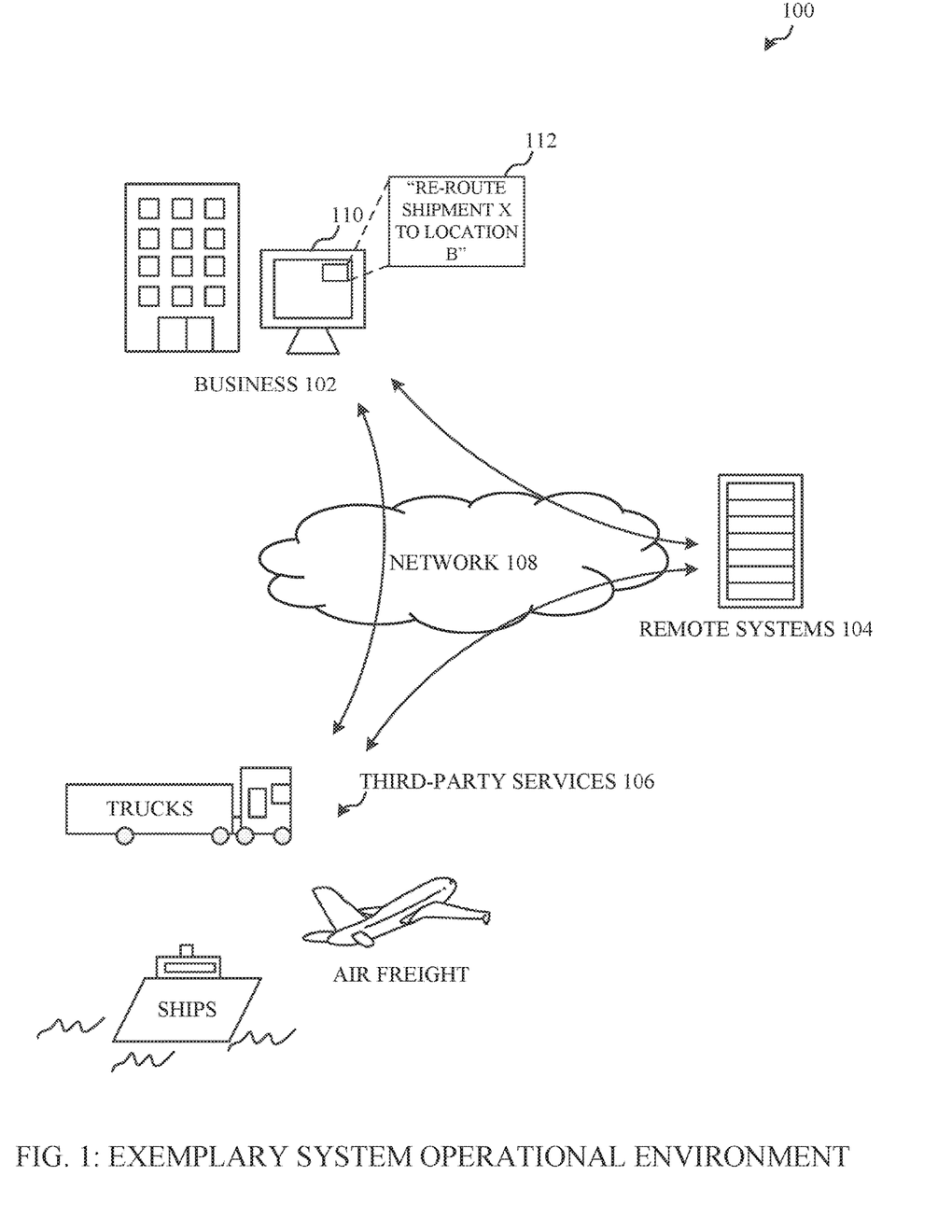
FIG. 1 is an exemplary operational environment of the present system, according to one embodiment of the present disclosure.

Referring now to the drawings, FIG. 1 illustrates an exemplary operational environment 100 of the present system, according to one embodiment of the present disclosure. In various embodiments, FIG. 1 illustrates an exemplary environment 100 including a business 102, remote systems 104, and third-party services 106. According to various aspects of the present disclosure, the third-party services 106 may include (but are not limited to) carrier ships, freight planes, semi-trucks, warehouses, loading docks, etc. According to various aspects of the present disclosure, the third-party services 106 may provide a service to or support a logistics outcome for the business 102, such as delivering a shipment of products that the business 102 intends to sell. In a particular embodiment, the third-party services 106 may communicate real-time updates regarding the provided service to the business 102 and/or the remote system 104 via a network 108. In certain embodiments, these real-time updates may be processed for optimizing outcomes in the system.

For example, consider a scenario where a business (e.g., the business 102) is expecting a shipment of perishable items (shipment X) to be delivered via air freight to a location A. In this example, aspects of the present systems and methods allow for the business 102 to access real-time updates regarding the status of the shipment X, as well manage logistics relating to the shipment X. In one embodiment, a user of the system may be alerted that the air freight is delayed indefinitely due to inclement weather. Furthermore, the system may present alternative suggestions for other shipments to reroute to location A, alternative locations for rerouting the shipment X to prevent the shipment from perishing (if possible), etc. Accordingly, the system may receive situational data/context from the third-party services 106, determine potential optimized outcomes, and furthermore present these potential optimized outcomes to the user.

In particular embodiments, the systems and methods described herein may allow for a user to be presented with a potential optimized outcome without a prior supply chain/shipment error or incident. For example, external pressures, such as foreign policy, may drive upward the prices of certain imports, such as fossil fuels. In various embodiments, the present systems and methods may detect this price increase (regardless if the price increase is gradual or sharp) and furthermore detect if current business processes are optimized. In a particular embodiment, the system may suggest to deliver certain products by truck rather than by air freight because the fuel saving is significant enough to make a substantial impact of the businesses profitability. According to various aspects of the present disclosure, these insights are provided automatically and are driven by machine learning, legacy intelligence, etc.

As shown in the present embodiment, the business 102 includes a computing device 110 (e.g., a mobile computing device, a desktop computer, etc.). In various embodiments, the computing device is operable by a user, where the user may interact with the computing device to manage business logistics. In particular embodiments, the systems and methods described herein may operate "behind-the-scenes" from the user's typical work environment, where the system may continuously monitor aspects of the business logistics and furthermore suggest actions for optimizing business outcomes. In one embodiment, and as shown as a pop-up "card" or advisor on the screen of the computing device 110, the system may present a suggestion 112 in response to detecting an opportunity for optimizing a logistics scenario. As shown in the present embodiment, the suggestion 112 includes a recommendation that the user "Re-route shipment X to location B." In particular embodiments, the user may choose to accept the suggestion 112, which may in return trigger the system to process the suggestion 112 (or advisor) via one or more analyzers. According to various aspects of the present disclosure, the computing device 110 may process the suggestion 112, or the remote systems 104 may process the suggestion 112 for executing the suggested action.

Figure 2:
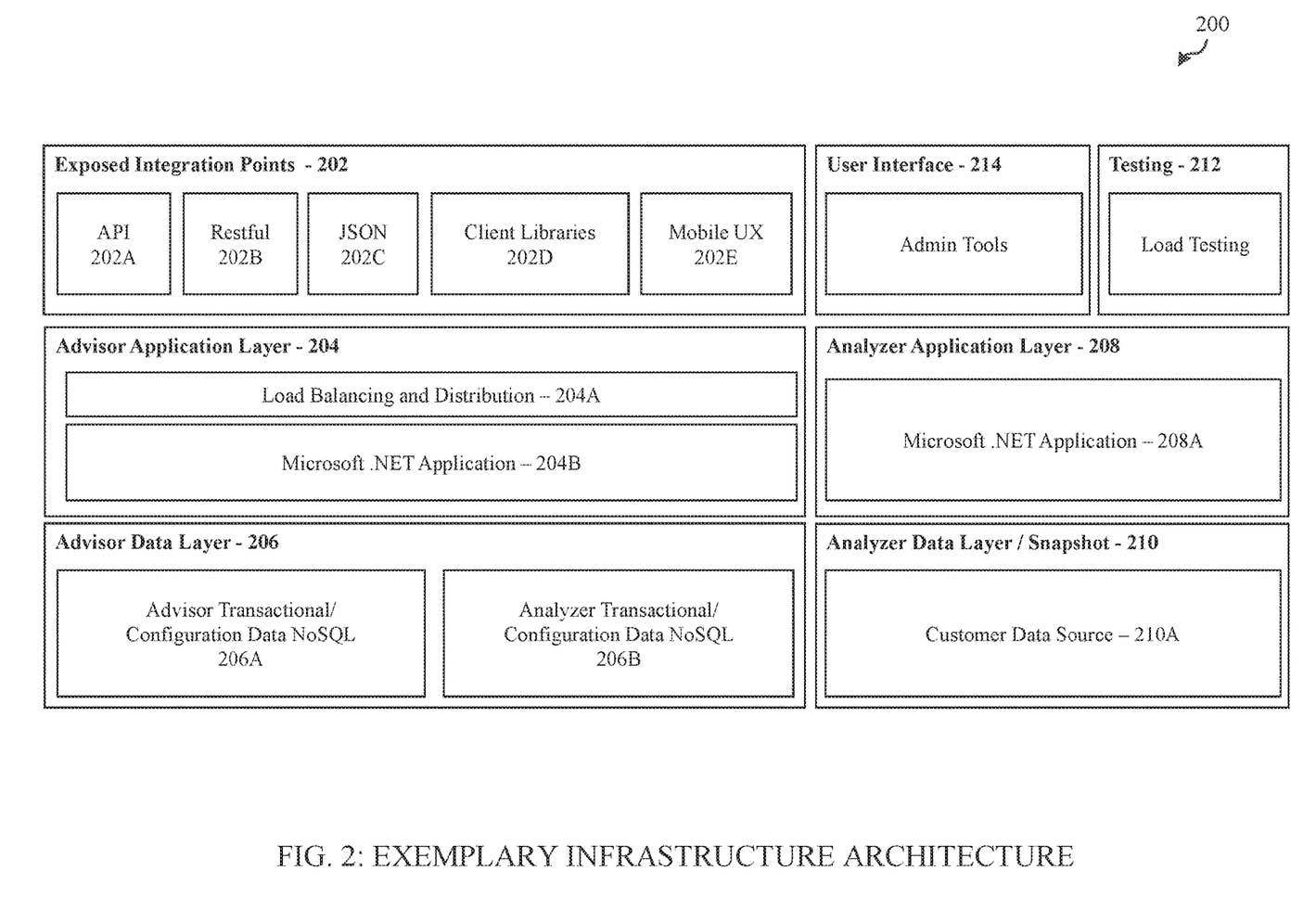
FIG. 2 illustrates an exemplary infrastructure architecture of the present system, according to one embodiment of the present disclosure.

Turning now to FIG. 2, an exemplary system architecture 200 is shown, according to one embodiment of the present disclosure. In one embodiment, the system architecture shown may reside on the computing device 110 or remote system 104 illustrated on FIG. 1. According to various aspects of the present disclosure, the system architecture 200 illustrated in the present embodiment allows for the system to receive data from and transmit data to the third-party services 106, accept user input data (for configuring self-service advisor cards), connect to remote systems 104, etc. In particular embodiments, the system includes one or more servers wherein each server includes a plurality of processors, databases, and analytics layers for analyzing particular data sets and making decisions based on the analytics data. As illustrated in the present embodiment, the system architecture 200 and infrastructure may be hosted on any appropriate Infrastructure as a Service (IaaS) platform, such as Amazon Web Services (AWS) or Azure. In certain embodiments, the infrastructure architecture includes various modules such as exposed integration points 202, an advisor application layer 204, an advisor data layer 206, an analyzer application layer 208, analyzer data layer/snapshot 210, a testing module 212, a user interface 214, and others as necessary.

In one embodiment, the exposed integration points 202 are modules for handling tasks such as accessing data, receiving instructions from a user, presenting information to the user, etc. According to various aspects of the present disclosure, the exposed integration points are the components of the system that mesh with the user's preexisting system (e.g., the user's operating system). In various embodiments, the exposed integration points 202 include sub-modules such as various application programming interfaces (APIs) 202A, representational state transfer (REST) or RESTful web services 202B, JSON data modules 202C, client libraries 202D, and a mobile UX module 202E. According to various aspects of the present disclosure, the various APIs allow for the present system to be integrated into new and preexisting processes by providing web services the ability to access the various data sets in the system and/or data elements received by third-party services. In a particular embodiment, the client libraries 202D include java script files for integrating the system capabilities into a web browser or web application. In one embodiment, the mobile UX 202E enables a full-service integration method outside of proprietary systems to support cases and instances where proprietary systems are not integration friendly or integration capable.

In various embodiments, the user interface (UI) 214 may be a web-based mechanism for presenting the visual aspects of the system to the user. In one embodiment, the UI 214 allows the user to access administrative tools 214A as well as configure system settings. In a particular embodiment, the UI 214 may be a web tool that is integrated into a web browser, a stand-alone application operating in parallel to other applications, etc.

According to various aspects of the present disclosure, the testing module 212 includes a load testing sub-module 212A for performing load balance testing, scalability, and reliability testing for the system. In one embodiment, performing tests such as load balancing provides the system with insight into how the system may react and perform under both normal and peak load conditions. According to a particular embodiment, the testing module 212 may allow the maximum operating capacity of the overall system, as well as potential bottlenecks, to be identified.

In a particular embodiment, the advisor application layer 204 includes sub-modules for load balancing and distribution 204A, as well as platform hosting 204B. In various embodiments, the advisor application layer sub-modules allow for scalability independent of other parts of the platform. In one embodiment, the advisor application layer 204 and analyzer application layer 208 may be built upon an application framework, such as Microsoft .NET (204B and 208A). In some embodiments, application frameworks such as Microsoft .NET allow for software applications to implement class libraries for providing user interface, data access, database connectivity, cryptography, web application development, network communications, etc. In one embodiment, the advisor application layer 204 is responsible for supporting the exposed integration points.

In one embodiment, the advisor data layer 206 provides scalable storage used by both the advisor platform layer and the analyzer platform layer (to be described in FIG. 2), thereby acting as an intermediary between the two platform layers. In the present embodiment, the advisor data layer 206 includes both advisor transactional data 206A and analyzer transactional data 206B, which may be stored in one or more NoSQL databases. In some embodiments, the advisor data layer may also include analyzer configuration data and advisor configuration data. Advisor configuration data is a user configurable and customizable representation of an advisor including the UI elements, functional elements, and action elements that the advisor may use in order to execute the recommended business/logistics task (or any task, appropriately). In one embodiment, analyzer configuration data is a user configurable and customizable representation of the analyzer including self-service user input, machine learning algorithms and models, traditional relational and non-relational database procedures or any other user self-service configured data representation. For purposes of this disclosure, the terms "user configurable" and "user customizable" data may also be referred to herein as "self-service".

In various embodiments, the analyzer data layer 210 may act as a temporary storage location for user data. In some embodiments, the analyzer data layer 210 is connected to the analyzer platform layer. According to various aspects of the present disclosure, the analyzer data layer 210 may include a customer data source 210A. In one embodiment, the customer data source 210A may be one or more databases including information such as a company's days sales outstanding (DSO), accounts receivables (AR) balance, and other appropriate business related metrics.

Figure 3:
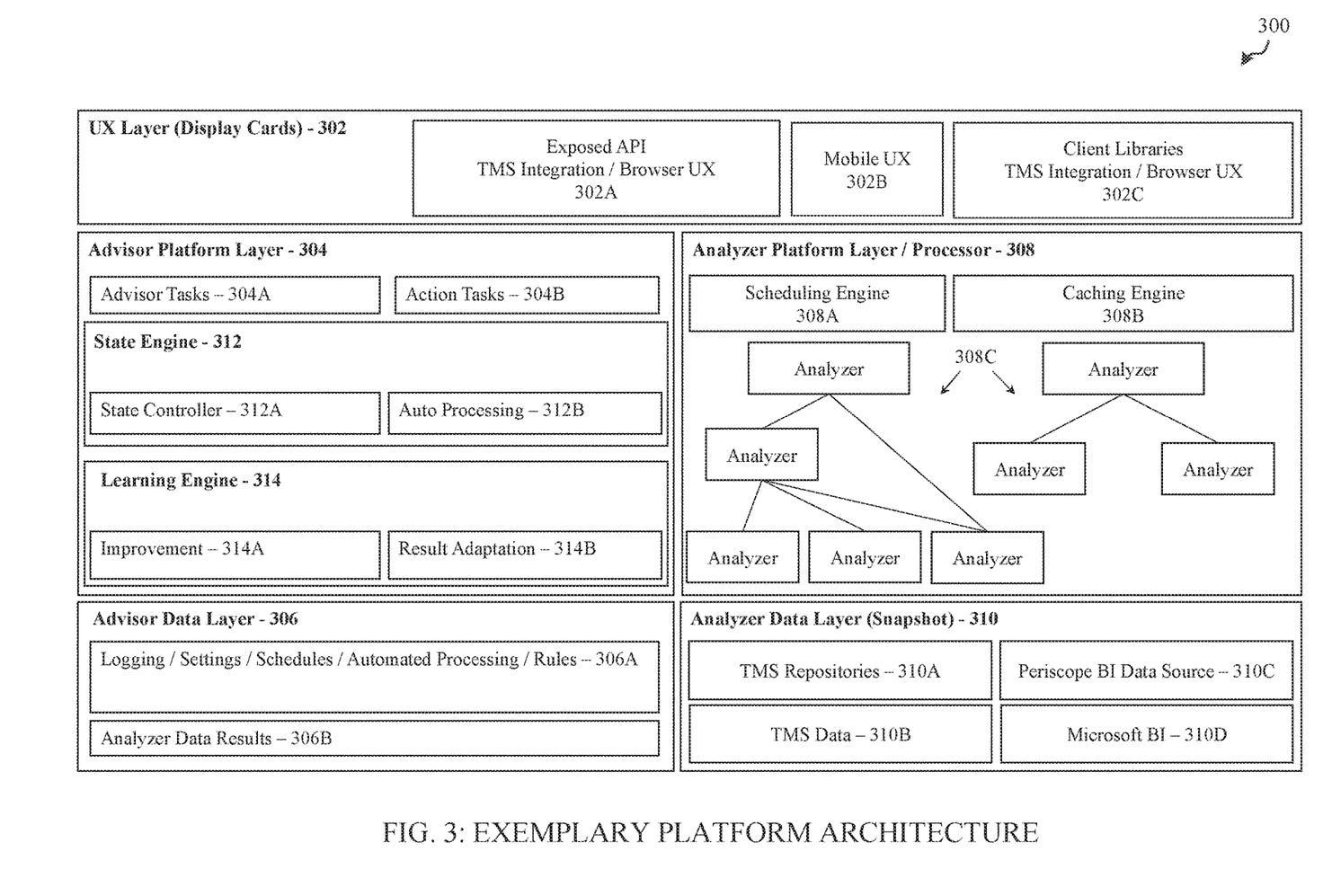
FIG. 3 illustrates an exemplary platform architecture of the present system, according to one embodiment of the present disclosure.

FIG. 3 illustrates an exemplary platform architecture 300, according to one embodiment of the present disclosure. In various embodiments, the platform architecture 300 includes modules that complement the modules in the infrastructure architecture as shown in FIG. 2. In particular embodiments, the platform architecture 300 may reside locally to the architecture 200, or the platform architecture 300 may reside on a remote system (such as the remote systems 104). According to various aspects of the present disclosure, the platform architecture 300 includes modules such as a UX layer 302, an advisor platform layer 304, an advisor data layer 306, an analyzer platform layer/processor 308, and an analyzer data layer 310.

In a particular embodiment, the UX layer 302 may be a front-end and user-facing tool for a user to input system requests (such as entering advisor requests or self-service advisor cards). In various embodiments, the UX layer includes various modules such as an exposed API for transportation management services (TMS) integration and web browser interaction 302A, a module for controlling mobile user interaction 302B, a module for implementing client libraries for TMS integration 302C, etc. In a particular embodiment, the UX layer 302 presents the advisor responses to the user by displaying one or more "cards" to the user. According to various aspects of the present disclosure, a card is a pop-up, slide-out, or any appropriate notification, ticket, or alert for presenting a user with additional information relating to a particular advisor.

In one embodiment, the advisor platform layer 304 is a software and hardware configuration for performing machine learning and artificial intelligence related computing operations, such as executing advisor tasks 304A and action tasks 304B. In various embodiments, the advisor platform layer 304 includes a state engine 312 as well as a learning engine 314. In a particular embodiment, the learning engine 314 is a machine learning and artificial intelligence module for analyzing situations and advisors, comparing the situations and advisors to previous outcomes, and making intelligent decisions based on the context of each particular situation. In some embodiments, the learning engine 314 implements machine learning techniques such as supervised learning, unsupervised learning, reinforcement learning, random forest generation, etc., via an improvement module 314A and a results adaptation module 314B.

According to various aspects of the present disclosure, the state engine 312 determines which results and advisors to present to the user after processing (via a state controller 312A and/or an auto processor 312B). In one embodiment, the learning layer (e.g., the advisor platform layer 304) is responsible for adaptation, evaluation, and constant improvement of the advisors allowing each to dynamically become more effective for the user and company (e.g., business 102). In various embodiments, the learning layer helps determine what advisors should be shown, what the advisor should show as content, and what options should be shown as actions for an advisor. In particular embodiments, additional system intelligent work activity occurring in the platform results in presenting the organization's desired state based on data analysis, interpretation, and context.

In one embodiment, the analyzer platform layer/processor 308 includes various sub-modules such as a scheduling engine 308A, and a caching engine 308B. In particular embodiments, the analyzer processor 308 is responsible for retrieving data and processing data against a user's sourced data. In some embodiments, the analyzer processor determines when caching should be refreshed. In one embodiment, analyzers process single tasks and rely on other processors for handling data. Analyzers evaluate a data set which returns a measurable result. As seen in the present embodiment, analyzers may be structured as decision trees (308C) within the analyzer platform layer 308. In various embodiments, analyzers may be structured as random decision forests. In particular embodiments, random decision forests include a plurality of decision trees and provide an ensemble learning method for classification and other machine learning tasks, wherein a plurality of decision trees are arranged at the beginning of a process and the most effective or valuable decision tree is evaluated. According to various aspects of the present disclosure, implementing random decision forests allows for the system to evaluate limitless possibilities of analyzer combinations.

In various embodiments, the advisor data layer 306 includes various sub-modules such as a logging/settings/schedules/automated processing/rules sub-module 306A and an analyzer data results sub-module 306B. In one embodiment, the advisor data layer 306 provides scalable storage used by the advisor platform layer and analyzer platform layer 304 as an intermediary between the two platform layers.

In certain embodiments, the analyzer data layer/snapshot 310 includes various sub-modules such as TMS repositories 310A, TMS data 310B, and business intelligence modules powered by services such as Periscope 310C and Microsoft Power BI 310D. In a particular embodiment, the analyzer data layer 310 provides a temporary storage location for customer data. In one embodiment, import functionality allows the system to bring data into this layer of the system.

Figure 4:
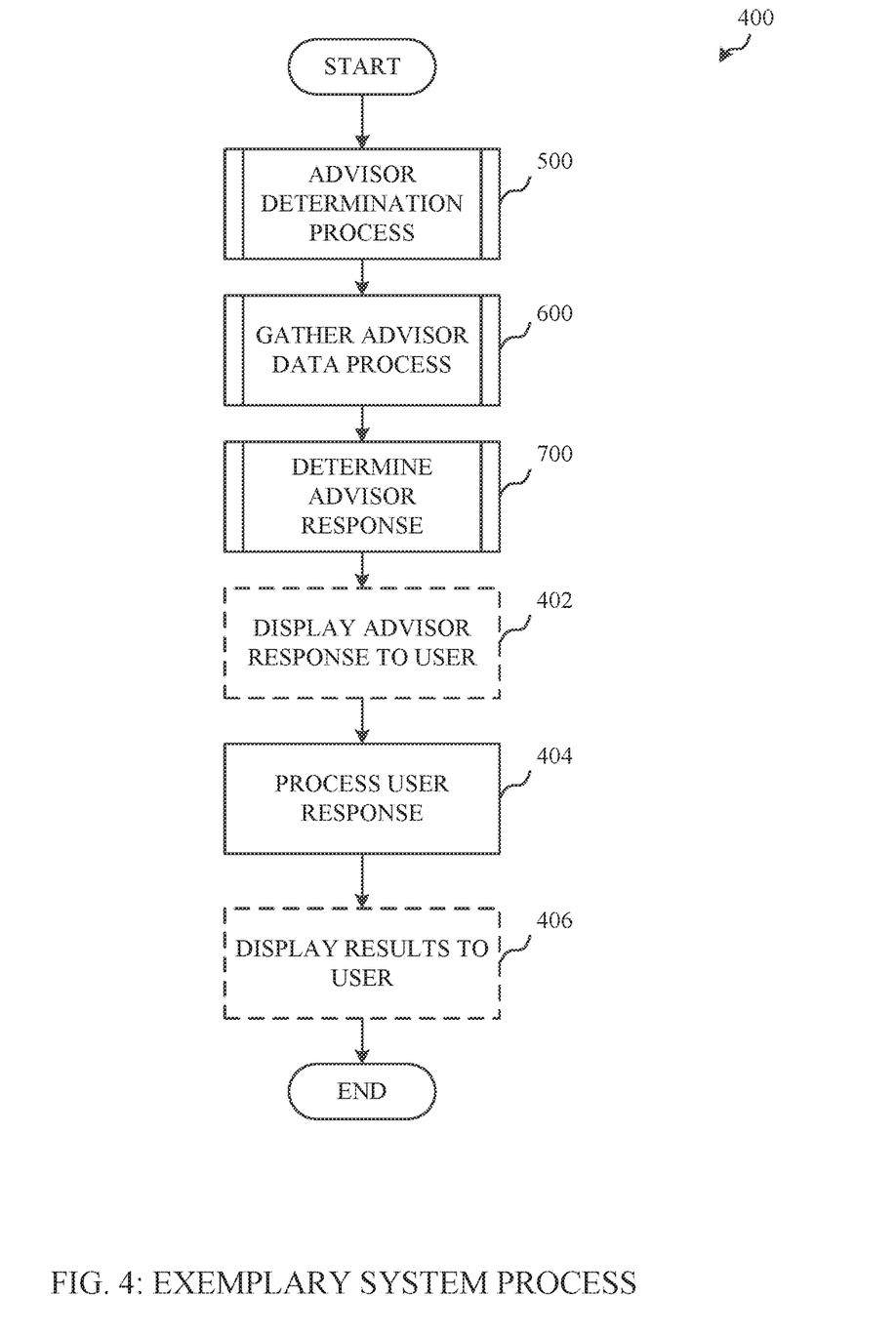
FIG. 4 illustrates an overall exemplary system process flow, according to one embodiment of the present disclosure.

Referring now to FIG. 4, an overall exemplary system process 400 flowchart is shown, according to one embodiment of the present disclosure. In one embodiment, the exemplary system process 400 describes, at a high level, the steps included in optimizing various outcomes in a multi-factor system. In various embodiments, the process may be a loop initiated by a user querying the system for information relating to optimizing a particular outcome. For example, the process may be triggered in response to a user entering a request or query into a UI search bar (e.g., on a web browser) for information relating to a certain step in a workflow. In one embodiment, the system provides a user interface, client libraries, etc., in order to receive inputs and commands from the user. In some embodiments, the process operates for an undetermined amount of time until instructed to terminate by a user (e.g., the process may continuously monitor third-party resources in the multi-factor system and furthermore continue to generate optimal advisor outcomes via machine-learning techniques). According to various aspects of the present disclosure, the exemplary process 400 may be an automated process where the user is generally unaware of changes to logistics workflows. For example, the system may be configured to monitor certain prices, transportation routes, weather patterns, etc., and automatically modify pre-existing logistic workflows (or create new workflows) as a result.

In one embodiment, the first step of the exemplary process 400 includes a sub-process, the process 500, for determining the relevant advisors in response to a user input or logistics opportunity, which will be described in greater detail below in association with the discussion of FIG. 5. In various embodiments, determining relevant advisors includes the system inputting and processing situation context. In various embodiments, situation context is information relating to the particular advisor request, the pre-existing workflow of the requesting user, global and local external factors (e.g., weather, regulations, etc.) and any other appropriate piece of information that may impact a logistics workflow. For example, a user of the system may wish to be presented with information relating to the best shipment routes from New York to China. In response to being presented with this situation, the system may determine the best advisors for optimizing the outcome by gathering any previous advisors that relate to any aspect of the current context. As discussed throughout the disclosure herein, optimizing a shipment route from New York to China may be an automated process and may execute generally without user involvement.

In response to executing the advisor determination process 500, the exemplary process 400 may proceed to the advisor data gathering process 600. In some embodiments, gathering advisor data includes transmitting and receiving data from one or more databases (e.g., databases included in the remote systems 104 and/or the computing device 110). In one embodiment, gathering advisor data may include executing the analyzer engine(s) to process one or more analyzers relating to the particular advisor context (e.g., optimal shipping routes from New York to China). Aspects of the advisor data gathering process 600 will be discussed in greater below in association with FIG. 6.

In various embodiments, in response to gathering the advisor data, the exemplary process 400 may proceed to the determine advisor response process 700 (to be discussed in greater detail below). According to various aspects of the present disclosure, the learning engine 314 may provide previous outcomes from similar advisors in order to determine the most informed response. In one embodiment, the process 700 includes gathering history relating to the user, gathering history relating to the advisor, and analyzing the business process workflow via one or more analyzers. In various embodiments, the learning engine 314 uses machine learning techniques, such as decision tree learning, in order to process and predict user behavior. For example, the system user may have a recorded history of repeatedly selecting a certain freight carrier as a preferred shipping method. In one embodiment, the learning engine may gather data from other advisors and determine that, in some scenarios, another freight carrier may be a quicker and more cost efficient shipping method. In these scenarios, the system may present the user with a recommendation to use the certain freight carrier rather than the other freight carrier. Prior to presenting the user with alternative workflow options, the learning engine 314 may calculate a confidence measure, based on the success rates of previous advisors across various users, that the alternative workflow option will likely have a high rate of success. In various embodiments, scenarios such as the one discussed immediately above will be discussed below in associated with FIG. 7.

In various embodiments, the optional step 402 includes displaying the advisor response to the user. In certain embodiments, displaying the advisor response to the user includes presenting the user (on a computing device display or any other appropriate output module) with a card, ticket, pop-up, etc., including details relating the determined advisor response. In one embodiment, the advisor response is a recommendation to the user for taking a particular action based on the context given to the system. In some embodiments, the step 402 is optional and may not execute in embodiments where advisors are processed automatically and without user awareness and/or involvement.

In one embodiment, at step 404, the user determines which advisor response (if any) he/she would like to proceed with. In response to the user selecting an advisor response, the system initiates an action processing module for processing the selected advisor response as well as executing the required tasks for configuring the user's workflow to include the proposed advisor response. For example, referring back to the example of finding the best shipping routes from New York to China, the system may have presented optimal shipping routes to the user, but in response to processing weather related data which would impact the shipping time, the system further recommended an air freight service instead. In one embodiment, if the user were to select the air freight advisor response, the system may further modify the user's workflow to direct certain goods to be delivered to the airport rather than a shipping yard. In various embodiments, changes to logistics workflows, such as the changed described immediately above, may be executed automatically based on system configurations (e.g., approved system changes, changes predicted to reduce expenses by various amounts, etc.).

At step 406, the system presents the user with activity results, according to one embodiment of the present disclosure. In some embodiments, presenting the user with activity results includes confirmation of a workflow or logistics modification, statistics relating to the recommended and selected advisor response, expected outcomes from the recommended and selected advisor response, etc. Similar to step 402, the step 406 is optional such that results may not be presented to a user in embodiments where advisors are processed automatically and without user awareness or involvement. For example, the system may not display particular results to a user if the system is configured to automatically modify a logistics workflow in response to detecting changes in various factors such as fuel prices, road blocks, weather patterns, global economy shifts, etc. As mentioned above, the system may continually execute on a loop. Therefore, in one embodiment, after the step 406 the process may begin again.

Figure 5:
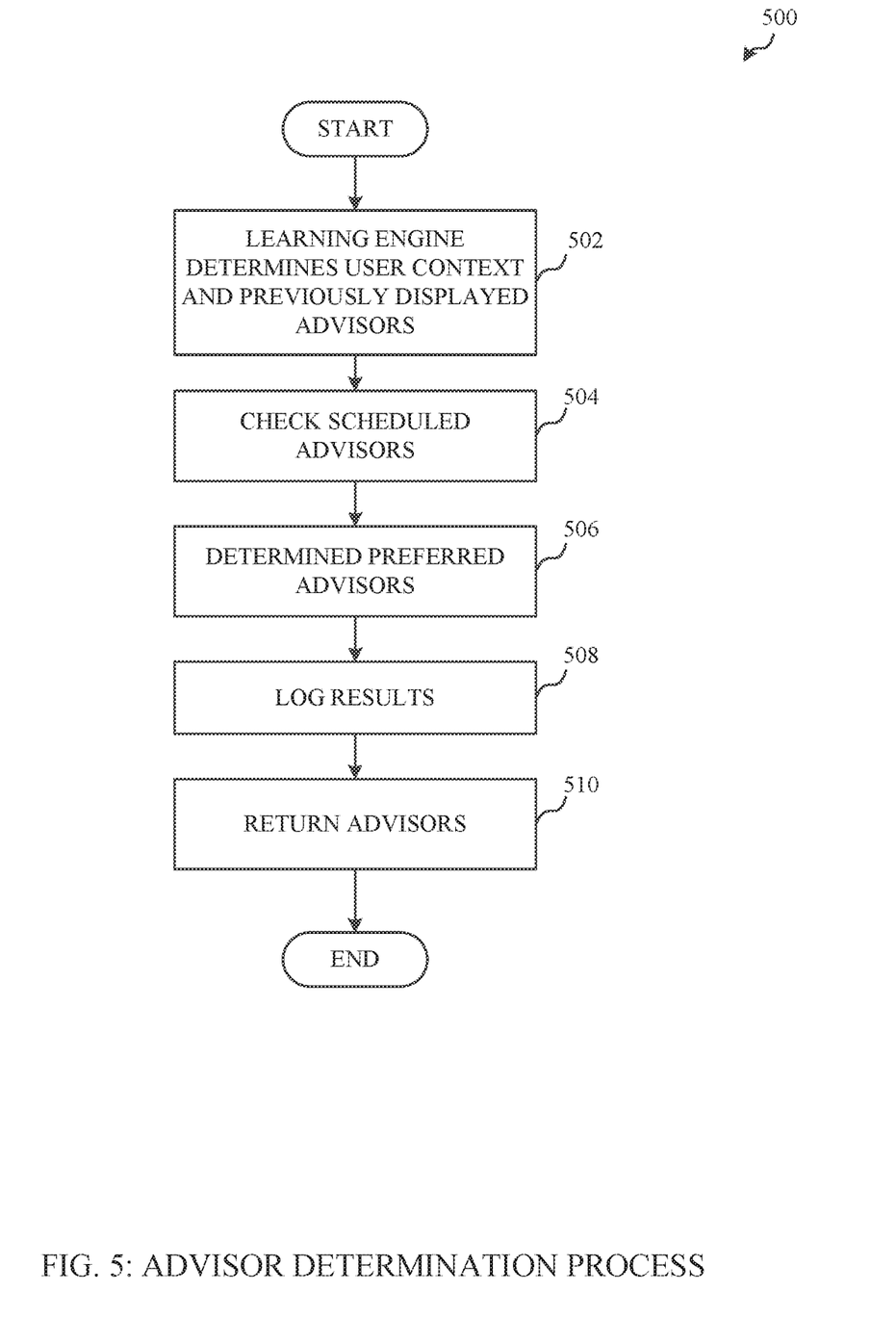
FIG. 5 illustrates an exemplary relevant advisor determination process, according to one embodiment of the present disclosure.

Referring now to FIG. 5, a flowchart of an advisor determination process 500 is shown, according to one embodiment. In various embodiments, this exemplary process 500 includes steps for determining relevant advisor responses to present to the user. In a particular embodiment, the process 500 may be executed by the learning engine in response to a user engaging the system with a request for modifying a logistics workflow.

Accordingly, in one embodiment, the process 500 begins at step 502, where the system (e.g., the learning engine) determines the user context and any previously displayed advisors. In particular embodiments, the user context may include any data inputted by the user during his/her request for an advisor. In some embodiments, the system maintains a record or cache of previously displayed advisors which allows for the system to determine if a similar request was previously handled. In various embodiments, determining if a similar request was previously handled may allow for the system to provide the user with meaningful results in less time, or the system may already have on record the user's preferred advisors based on his/her request.

At step 504, the system searches for scheduled advisors, according to one aspect of the present disclosure. In some embodiments, searching for scheduled advisors includes checking and monitoring activity in the scheduling engine. In one embodiment, a scheduled advisor is an advisor that may be configured to execute at a predetermined time, such as the system determining traffic in and out of particular shipping ports. In various embodiments, checking for scheduled advisors may allow for the system to display the scheduled advisor ahead of its scheduled time, or the system may respond to the user with a prompt informing him/her about the already scheduled advisor.

In one embodiment, at step 506, the system gathers history for the advisors, which may allow for the system to determine one or more advisors preferred by the user (based on his/her request or the particular context). According to a particular embodiment, gathering history for the advisor may include the system finding previous workflow paths or logistics scenarios and determining the preferred or most effective advisors for those particular scenarios. In various embodiments, the system uses machine learning to determine which advisors are likely to get a response, as well as add value, to the particular scenario. In one embodiment, the system may analyze data relating to time benefits, cost saving, reducing steps, etc., in order to determine how particular advisors will add value. According to various aspects of the present disclosure, the system may implement predictive modelling and analytics to predict certain advisor outcomes.

At step 508, and according to one embodiment, the resulting response options are logged (e.g., stored in one or more system databases, a cache, an advisor record, etc.). As discussed immediately above, the system may rely on previously identified advisors for future user requests. In certain embodiments, logging the advisor results at step 508 may improve the computing performance of the system in future advisor requests.

In various embodiments, at step 510, the system returns the advisors (e.g., to a processor at the computing device) for displaying the advisors to the user. In particular embodiments, returning the advisors to the user may include modifying the display at the user's computing device, such that the user may be presented with the advisor and be prompted to engage with the advisor. In some embodiments, the system may not display advisor data at the user's computing device, but rather automatically modify a logistics workflow without user engagement or general awareness.

Figure 6:
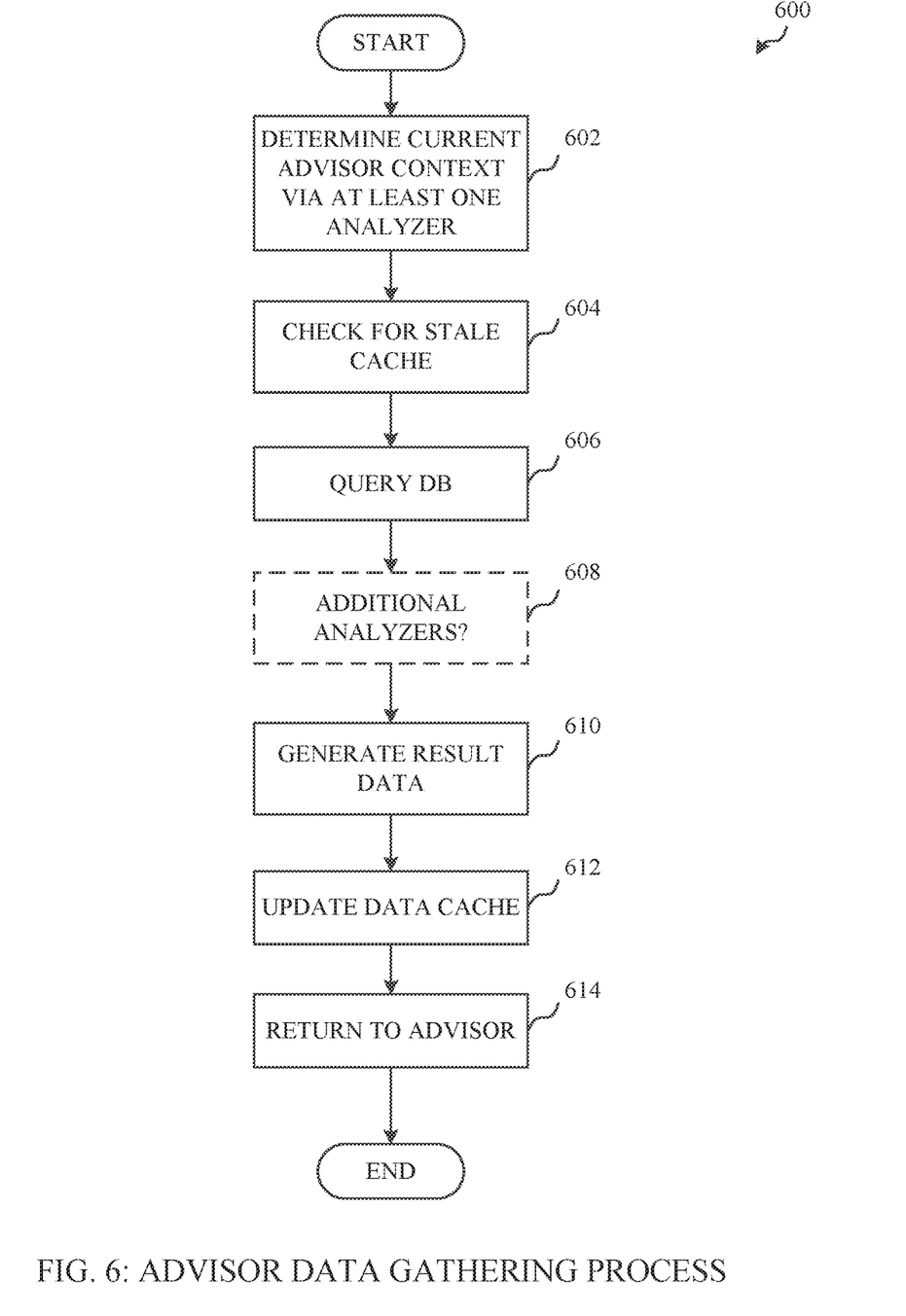
FIG. 6 illustrates the exemplary analyzer data gathering process, according to one embodiment of the present disclosure.

Turning now to FIG. 6, the exemplary advisor data gathering process 600 is shown, according to one embodiment of the present disclosure. According to various aspects of the present disclosure, the exemplary process 600 is executed via an analyzer and/or advisor engine and allows for the system to generate an advisor/advisor response including data processed by one or more analyzers. Accordingly, the generated advisors may be displayed to the user for presenting the user with suggestions for modifying logistic workflows, and the like. In one embodiment, the exemplary process 600 begins at step 602 where the analyzer engine receives and determines the user context as well as the advisor(s) context. In response to determining the user context as well as the advisors context, the system may begin to process an analyzer (which may be a first analyzer) based on the advisor context.

In one embodiment, at step 604 the analyzer checks for stale cached data. As mentioned above at step 502 of the exemplary process 500, the system may be configured to rely on previously stored or cached data for improving the look-up speeds of the computing device, as well as to reduce unnecessary instructions. At step 604, according to various embodiments, checking for stale cache allows for the system to determine if advisor context similar to the advisor context determined at step 602 already exists in memory. At step 606, the system queries one or more system databases in addition to checking for cached data.

In a particular embodiment, at step 608, the additional (secondary) analyzers may be called (if needed). According to various aspects of the present disclosure, this is an optional step and is not required. In one embodiment, calling additional analyzers introduces more specialized computing power into the process. For example, one particular analyzer may be configured for handling airline traffic and related information, while another analyzer may be configured for handling shipping traffic and related information. In various embodiments, the additional analyzers may be processed in parallel (e.g., on separate computing threads) to generate the advisor response data.

According to various aspects of the present disclosure, at step 610, the results from the at least one analyzer (and any additional analyzers) are combined to produce a combined/aggregated advisor result. In some embodiments, the combined/aggregated advisor result is JSON data, or the data may be processed and formatted according to any customizable specifications.

At step 612, the analyzer cache is updated, according to various embodiments. In one embodiment, updating the analyzer cache may include storing the processed and formatted aggregated advisor result in the cache. In particular embodiments, caching the result data allows for the system to reduce latency due to the proximity of cache memory to the system processor(s).

In one embodiment, at step 614, the analyzer processing is generally completed, the statistics and data from the aggregated advisor results are logged, and the analyzer result may be returned to the advisor. In various embodiments, the advisor may format the advisor result data to be presented to the user interface (e.g., format the data to be presented as an alert or the like).

Figure 7:
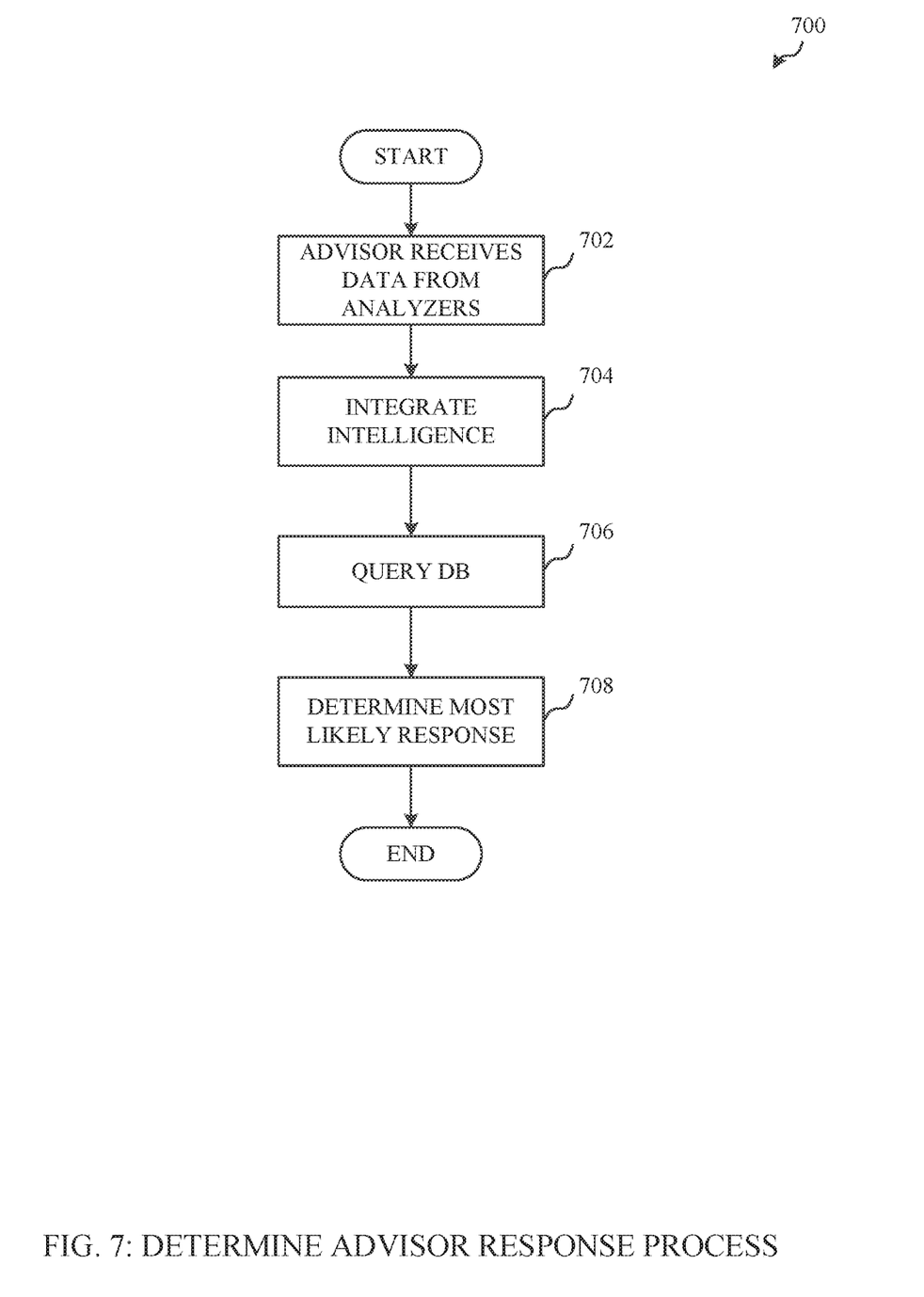
FIG. 7 illustrates the exemplary determine advisor response process, according to one embodiment of the present disclosure.

Turning now to FIG. 7, a flowchart of the exemplary determine advisor response process 700 is shown, according to one aspect of the present disclosure. In various embodiments, and discussed above in the discussion of the exemplary process 600, analyzers may generate data to be presented to the user in the form of an advisor or advisor card. According to various aspects of the present disclosure, the exemplary process 700 allows for the system to further process that data for integrating additional artificial intelligence, consulting intelligence, self-serviced user insights, etc. Accordingly, at step 702, the process begins when the advisor receives the analyzer data (e.g., from the learning engine) in order to determine user context, situational context, as well as advisor context.

In various embodiments, at step 704 the system may integrate the data received at step 702 with additional intelligence data. In some embodiments, the additional information may include business goals and objectives, information relating to business departments, business topics, business data, user industry experience and legacy data, etc.

At step 706, the system queries one or more databases within the system to gather historical data/summaries for the user as well as for the advisor. In various embodiments, the system gathers, from the one or more databases (e.g., remote systems 104), the previous advisor options and information about previous responses that were selected by the user. In particular embodiments, the system may query the one or more databases for automated actions approved by the user, or the system may query for the advisor history. In some embodiments, gathering the advisor history may include gathering previous advisor options as well as gathering selected responses. In some embodiments, the learning engine may use machine learning algorithms and models to analyze queried business process workflows and logistics scenarios for predicting their respective outcomes compared to the current context.

At step 708, the system determines the most likely response based on previous data (e.g., queried data from step 706) and by analyzing the most recent relevant set of actionable tasks. According to various aspects of the present disclosure, when a most likely to succeed advisor response is determined, the system may return the result to the advisor and the process 700 may terminate.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed inventions may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed invention are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the invention is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed inventions will be readily discernible from the description herein, by those of ordinary skill in the art. Many embodiments and adaptations of the disclosure and claimed inventions other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed inventions. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed inventions. In addition, some steps may be carried out simultaneously, contemporaneously, or in synchronization with other steps.

The embodiments were chosen and described in order to explain the principles of the claimed inventions and their practical application so as to enable others skilled in the art to utilize the inventions and various embodiments and with various modifications as are suited to the particular use contemplated. Alternative embodiments will become apparent to those skilled in the art to which the claimed inventions pertain without departing from their spirit and scope. Accordingly, the scope of the claimed inventions is defined by the appended claims rather than the foregoing description and the exemplary embodiments described therein.

The invention claimed is:

1. A method for optimizing outcomes in logistics workflows via a self-service computer application at an electronic computing device, comprising the steps of:
   receiving a request from a user of the electronic computing device for identifying a logistics task for optimization, wherein the electronic computing device is running the self-service computer application and the self-service computer application modifies a display at the electronic computing device to present one or more task advisor tickets to the user, wherein the one or more task advisor tickets:
     visually overlay at least a portion of a self-service computer application graphical user interface ("GUI"), wherein the one or more task advisor tickets are slidably-exposed onto the GUI, and wherein the one or more task advisor tickets are otherwise not visible until being slidably-exposed onto the GUI; and
     comprise computer implementable logic for processing the request;
   identifying:
     the logistics task for optimization based on the one or more task advisor tickets, wherein the logistics task comprises one or more task parameters; and
     based on the identified logistics task and its respective task advisor ticket, one or more task analyzers for processing the optimization of the identified logistics task, wherein the one or more task analyzers correspond to the respective task advisor ticket and comprise computer-implementable logic for processing the optimization;
   in response to identifying the one or more task analyzers, retrieving logistics task data corresponding to the identified logistics task;
   determining, via the one or more task analyzers, an optimized logistics outcome, wherein determining the optimized logistics outcome comprises applying the logistics task data and the one or more task parameters to a plurality of potential outcomes, wherein the potential outcomes are included in a data set refined via machine learning techniques, the machine learning techniques comprising supervised learning, unsupervised learning, and reinforcement learning, and the data set comprising historical data relating to prior logistics task data, prior task parameters, and prior outcomes;
   modifying the self-service computer application GUI for presenting the user with the optimized logistics outcome, wherein presenting the user with the optimized logistics outcome comprises contextually representing the optimized logistics outcome within the one or more task advisor tickets as one or more selectable logistics actions by slidably exposing the one or more task advisor tickets comprising the one or more selectable logistics actions onto the GUI;
   receiving a respective logistics action selected by the user; and
   initiating the respective logistics action selected by the user, wherein initiating the respective logistics action selected by the user comprises notifying one or more third-party entities to modify a preexisting logistics workflow.

2. The method of claim 1, wherein the logistics task is identifiable from a group comprising shipments, deliveries, manufacturing schedules, and payment schedules.

3. The method of claim 1, wherein the one or more task parameters comprises routes, time frames, prices, personnel requirements, and weather factors corresponding to the logistics task.

4. The method of claim 1, wherein the logistics task data comprises real-time data, historical data, user-supplied data, and third-party data.

5. The method of claim 1, wherein identifying a logistics task for optimization further comprises automatically analyzing changes to the one or more task parameters via machine learning techniques.

6. A system comprising an electronic computing device configured for optimizing outcomes in logistics workflows via a self-service computer application, the electronic computing device comprising one or more processors operable to:
 receive a request from a user of the electronic computing device for identifying a logistics task for optimization, wherein the electronic computing device is running the self-service computer application and the self-service computer application modifies a display at the electronic computing device to present one or more task advisor tickets to the user, wherein the one or more task advisor tickets:
  visually overlay at least a portion of a self-service computer application graphical user interface ("GUI"), wherein the one or more task advisor tickets are slidably-exposed onto the GUI, and wherein the one or more task advisor tickets are otherwise not visible until being slidably-exposed onto the GUI; and
  comprise computer implementable logic for processing the request;
 identify:
  the logistics task for optimization based on the one or more task advisor tickets, wherein the logistics task comprises one or more task parameters; and
  based on the identified logistics task and its respective task advisor ticket, one or more task analyzers for processing the optimization of the identified logistics task, wherein the one or more task analyzers correspond to the respective task advisor ticket and comprise computer-implementable logic for processing the optimization;
 in response to identifying the one or more task analyzers, retrieve logistics task data corresponding to the identified logistics task;
 determine, via the one or more task analyzers, an optimized logistics outcome, wherein determining the optimized logistics outcome comprises applying the logistics task data and the one or more task parameters to a plurality of potential outcomes, wherein the potential outcomes are included in a data set refined via machine learning techniques, the machine learning techniques comprising supervised learning, unsupervised learning, and reinforcement learning, and the data set comprising historical data relating to prior logistics task data, prior task parameters, and prior outcomes;
 modify the self-service computer application GUI for presenting the user with the optimized logistics outcome, wherein presenting the user with the optimized logistics outcome comprises contextually representing the optimized logistics outcome within the one or more task advisor tickets as one or more selectable logistics actions by slidably exposing the one or more task advisor tickets comprising the one or more selectable logistics actions onto the GUI;
 receive a respective logistics action selected by the user; and
 initiate the respective logistics action selected by the user, wherein initiating the respective logistics action selected by the user comprises notifying one or more third-party entities to modify a preexisting logistics workflow.

7. The system of claim 6, wherein the logistics task is identifiable from a group comprising shipments, deliveries, manufacturing schedules, and payment schedules.

8. The system of claim 6, wherein the one or more task parameters comprises routes, time frames, prices, personnel requirements, and weather factors corresponding to the logistics task.

9. The system of claim 6, wherein the logistics task data comprises real-time data, historical data, user-supplied data, and third-party data.

10. The system of claim 6, wherein identifying a logistics task for optimization further comprises automatically analyzing changes to the one or more task parameters via machine learning techniques.

* * * * *